July 19, 1955     K. ZWICK     2,713,290
COPYING MACHINE
Original Filed Nov. 30, 1951
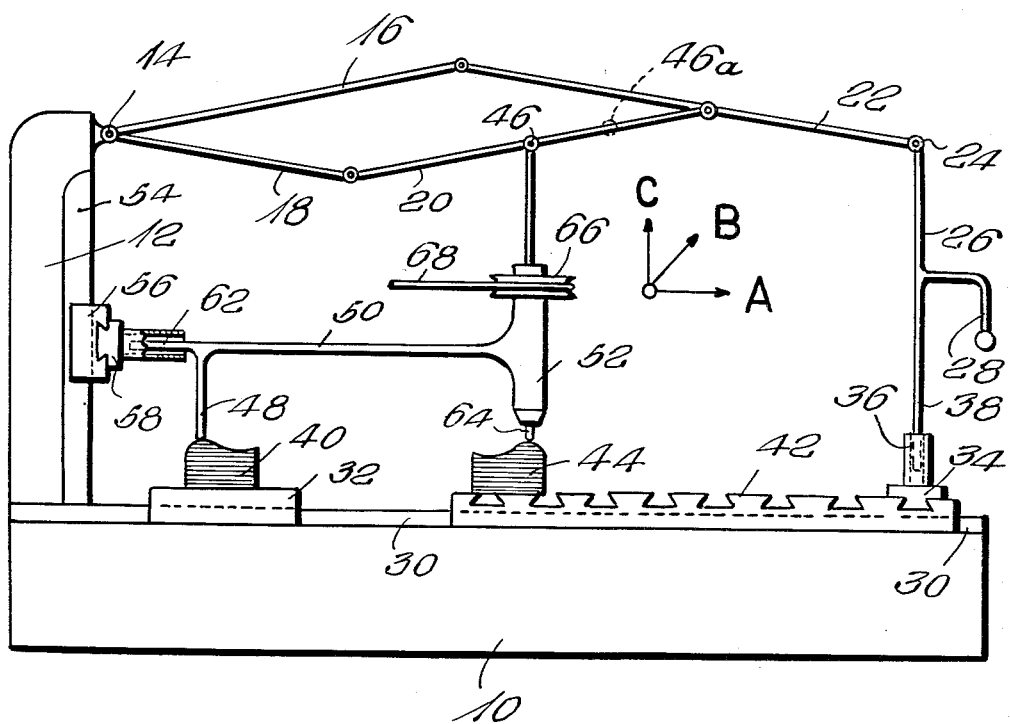
INVENTOR
Kurt Zwick,
BY John B. Grady
ATTORNEY United States Patent Office 2,713,290
Patented July 19, 1955

2,713,290
COPYING MACHINE

Kurt Zwick, Munich, Germany, assignor to Hans Deckel, Munich-Solln, Germany, and Friedrich Wilhelm Deckel, Post Tutzing, Germany Original application November 30, 1951, Serial No. 259,067. Divided and this application October 22, 1952, Serial No. 316,123

4 Claims. (Cl. 90—13.1)

My invention relates broadly to copying machines and more particularly to an improved copying machine and attachment therefor, employing an improved arrangement of pantograph system in connection with a tracing pin and a coacting tool.

This application is a division of my application Serial No. 259,067, filed November 30, 1951, for Copying Machine.

Heretofore in the art there have been copying machines in which through the movement of the tool in one direction a movement variable in any desired ratio can be imparted to the work across an additional friction transmission, for example, in the same direction in carrying out mirror operations. The necessity of using an additional device has the disadvantage, however, that this increases the purchase price of the machine.

In contrast to such known devices the present invention provides a structure by using means already existing on the machine, which forms a simple and hence economical copying device for the said purpose. In copying machines with a movable pantograph system, in which the tool bearing is inserted at a point of the pantograph and connected with the tracing pin over guide parts, the problem posed can be solved according to this invention in that the working table is coupled with another point of the pantograph in such a way that when moving the tool bearing in one direction, a movement of the working table in the same direction is produced adjustable over the pantograph system in any desired ratio.

My invention is set forth more fully in the specification hereinafter following by reference to the accompanying drawing which shows the invention in elevation.

The copying machine as set forth in the drawing consists of a base 10 carrying a vertical column 12. On this column there is, at 14, a pantograph of known type consisting of the links 16, 18, 20 and 22 mounted in such a manner that on the one hand it is movable in its plane and, on the other, pivotable about the bearing point 14. The particular position of the pantograph is equalized by known means not shown. At point 24 of the pantograph there is mounted a vertical member 26 which has a handle 28. By actuation of this handle the entire pantograph system can be moved in the desired direction.

In the base 10 there is provided a horizontal guide 30 in which a slide 42 is displaceably mounted. A second slide 34 is mounted on the slide 42 for displacement transverse to the direction of displacement of the latter. The slide 34 supports a vertical guide bushing 36 in which the lower end 38 of the member 26 engages for axial movement. The slide 42 is designed as a machine table on which workpiece 44 can be placed. In the guide 30 there is arranged another slide 32, likewise designed as a table, on which a model 40 is fastened. The tool bearing 52 is coupled with point 46 of the pantograph and rigidly connected through part 50 with the tracing pin 48. The tool bearing 52 is supported by means of a cross slide 56, 58, displaceable in the guide 54 in the column 12 and a guide pin 62 engaging in the bearing bushing 60 of the slide 58. The tool 64 is driven by a pulley 66 and a belt 68 by a power source not shown.

The mode of operation of the described device is the following:

If a workpiece is to be produced according to the model in mirror-reversed manner, the machine must be set as shown in the drawing. The model 40 and the workpiece 44 must be fastened in the proper working position on the tables 32 and 42, respectively, and the lower end of the axis 26 must be inserted in the guide bushing 36 of the slide 34. When the tool bearing 52 and the member 26 are in position with respect to the pantograph, as shown, the movement paths of the point 46 and of the member 26 carried out in the plane of the pantograph have a ratio of 1:2.

If the member 26 of the pantograph is now moved by means of the handle 28, for example, in the horizontal direction of the arrow A, then the machine table 42 with the workpiece 44 will move along the guide 30 with twice the speed of the tool bearing 52 in the same direction, that is, the workpiece precedes the tool bearing by twice the length of the path. Due to the rigid connection between the tracing pin 48 and the tool bearing 52 through part 50, this fact expresses in that the tool 64 gives the workpiece 44 in this direction a shape mirror-symmetrical to the fixed model 40.

The movement of the member 26 in the horizontal transverse direction, which is indicated in the perspective diagrammatically by the arrow B, has as its consequence a transverse movement of the slide 34 in relation to the now fixed table 42. It is thereby achieved that in the transverse direction the tracing pin is moved and the tool bearing moved in the same direction and by the same movements in relation to the model, the workpiece being stationary during such movement.

The moving of the member 26 in the direction of height, that is, in the direction of the arrow C, has as its consequence only a relative movement of the member 26 in relation to the guide bushing 36. The slide 34 and also the table 42 then remain stationary, so that the tracing pin 48 and the tool bearing 64 are moved in the same direction and by equal lengths in relation to the stationary model or workpiece.

It will be understood that the tool bearing need not always be connected only with point 46 of the pantograph. There may be used as transmission point, also another point, for example, point 46a, of the pantograph. In such a case, rather than operating in mirror symmetry with a transmission ratio of 1:2 at the pantograph, there is machined according to the model a workpiece which is mirror-symmetrically distorted, and this in a measure which corresponds to the adjusted transmission ratio on the pantograph.

The invention may also be carried out as an attachment for existing machines by applying the pantograph system, the cross slides, and the parts for making the rigid connection between the tracing pin and the tool bearing, in such arrangement, that such a machine can be used in the manner of the invention without the use of additional devices.

While the invention has been described in certain preferred embodiments, I realize that modifications may be made and I desire that it be understood that no limitations upon my invention are intended other than may be imposed by the scope of the appended claims.

What I claim as new and desire to secure by Letters Patent of the United States is as follows:

1. A copying machine comprising a frame structure, a model table mounted on said frame structure, a work table slidably mounted on said frame structure in a position displaced from said model table, a support on said frame structure, a tool bearing adjustably mounted on said frame structure, a rotatably driven tool mounted in said tool bearing, a workpiece mounted on said work table and engageable by said rotary driven tool, a model carried by said model table, a pantograph system supported on said support, said tool bearing being connected with a point of said pantograph system, a connection between said tool bearing and a tracing pin engageable with said model, and means connecting another point of said pantograph system with said work table whereby the movement of the tool bearing in one direction produces a corresponding displacement of the tool table in the same direction, said displacement being adjustable in any desired ratio over the pantograph system.

2. A copying machine of the movable pantograph type comprising a supporting structure having a horizontally extending base portion and a vertically extending column adjacent one side thereof, a model table mounted on said horizontally extending base portion, a model secured to said model table, a work table slidably mounted on said base structure and movable toward and away from said model table, a workpiece carried by said work table, a tracing pin, means for mounting said tracing pin over said model table for adjustable movement with respect thereto, a tool bearing connected with said tracing pin, a rotary driven tool carried by said tool bearing, a pantograph system pivotally connected with said vertically extending column, a pair of members connected at spaced positions with said pantograph system, one of said members being connected with said adjustable work table for controlling the movement thereof and the other of said members engaging said tool bearing and a connection between said tracing pin and said tool bearing whereby said pin may be variably moved over the surface of said model.

3. A copying machine as set forth in claim 2 in which said pantograph system comprises four pivotally connected links and wherein the member which connects with said tool bearing connects to a point intermediate the pivotal connections of one of the links with the coacting links of said pantograph system and where said member which connects with said work table connects to a junction point between two of the links of the pantograph system.

4. A copying machine as set forth in claim 2 in which the member which connects said work table with said pantograph system is slidably coupled in a direction with said work table for permitting vertical movement of said pantograph system simultaneously with lateral displacement of said work table.

References Cited in the file of this patent

UNITED STATES PATENTS 2,018,697   Zwick _____ Oct. 29, 1935